United States Patent
Ja et al.

(10) Patent No.: US 10,798,074 B2
(45) Date of Patent: *Oct. 6, 2020

(54) SYSTEM AND METHOD FOR PREVENTING WELL BEHAVING CLIENTS FROM CAUSING ACCOUNT LOCKOUTS IN A GROUP

(71) Applicant: Dell Products L.P., Round Rock, TX (US)

(72) Inventors: Yee Ja, Round Rock, TX (US); Marshal F. Savage, Austin, TX (US); Cyril Jose, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/783,387

(22) Filed: Feb. 6, 2020

(65) Prior Publication Data

US 2020/0177567 A1 Jun. 4, 2020

Related U.S. Application Data

(63) Continuation of application No. 15/891,940, filed on Feb. 8, 2018, now Pat. No. 10,594,671.

(51) Int. Cl.
*H04L 29/06* (2006.01)
*H04L 9/08* (2006.01)

(52) U.S. Cl.
CPC .......... *H04L 63/061* (2013.01); *H04L 9/0816* (2013.01); *H04L 63/068* (2013.01);
(Continued)

(58) Field of Classification Search
CPC ... H04L 63/083; H04L 63/061; H04L 9/0816; H04L 63/068; H04L 63/20;
(Continued)

(56) References Cited

U.S. PATENT DOCUMENTS 9,887,836 B1 2/2018 Roth
2016/0218866 A1 7/2016 Patil et al.
(Continued)

OTHER PUBLICATIONS

Wikipedia contributors. (Oct. 8, 2018). Replay attack. In *Wikipedia, the Free Encyclopedia*. Retrieved 21:49, Feb. 5, 2019, from https://en.wikipedia.org/w/index.php?title=Replay_attack&oldid=863032627; 6 pages, Oct. 8, 2018.
(Continued)

*Primary Examiner* — Amir Mehrmanesh
(74) *Attorney, Agent, or Firm* — Baker Botts L.L.P.

(57) ABSTRACT

Methods and systems for account authentication in a distributed computing node group may involve sending a message to a member, the message having a first timestamp, increasing an authentication failure count, receiving a first key-exchange message from the member, the first key-exchange message having a second timestamp, evaluating the second timestamp, and determining whether to ignore the first key-exchange message based on an evaluation of the second timestamp. The first timestamp may be associated with a message received from the member prior to sending the message with the first timestamp to the member. The first key-exchange message may include a value computed by the member based on a group passcode shared with the member. The evaluation of the second timestamp may be based on at least one of a default value, the authentication failure count, or a timestamp associated with the group passcode.

20 Claims, 7 Drawing Sheets

(52) U.S. Cl.
CPC ............ *H04L 63/083* (2013.01); *H04L 63/20* (2013.01); *H04L 2463/121* (2013.01)

(58) Field of Classification Search
CPC ............ H04L 2463/121; H04L 9/0822; H04L 63/0435; H04L 63/065; H04L 9/0833; H04L 9/0891; H04L 9/16; G06F 21/606
See application file for complete search history.

(56) References Cited

U.S. PATENT DOCUMENTS

| | | |
|---|---|---|
| 2016/0344582 A1 | 11/2016 | Shivanna et al. |
| 2016/0365975 A1 | 12/2016 | Smith |
| 2017/0026144 A1 | 1/2017 | Zimmer |
| 2017/0126404 A1 | 5/2017 | Unagami et al. |
| 2018/0019869 A1 | 1/2018 | Savage et al. |

OTHER PUBLICATIONS

Wikipedia contributors. (Jun. 12, 2018). Lamport timestamps. In *Wikipedia, the Free Encyclopedia*. Retrieved 21:50, Feb. 5, 2019, from https://en.wikipedia.org/w/index.php?title=Lamport_timestamps&oldid=845598900; 4 pages, Jun. 12, 2018.

Wikipedia contributors. (Jan. 27, 2019). Vector clock. In *Wikipedia, the Free Encyclopedia*. Retrieved 21:52, Feb. 5, 2019, from https://en.wikipedia.org/w/index.php?title=Vector_clock&oldid=880371107; 3 pages, Jan. 27, 2019.

Wikipedia contributors. (May 16, 2018). Matrix clock. In *Wikipedia, the Free Encyclopedia*. Retrieved 21:52, Feb. 5, 2019, from https://en.wikipedia.org/w/index.php?title=Matrix_clock&oldid=841539991; 1 page, May 16, 2018.

UEFI, "Unified Extensible Firmware Interface (UEFI) Specification", Retrieved from <http://uefi.org> May 2017; 2899 pages, May 2017.

SYSTEM AND METHOD FOR PREVENTING WELL BEHAVING CLIENTS FROM CAUSING ACCOUNT LOCKOUTS IN A GROUP

BACKGROUND

Field of the Disclosure

This disclosure relates generally to information handling systems and more particularly to systems and methods for preventing well behaving clients from causing account lockouts in a group.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system.

SUMMARY

A secondary information handling system, which may be in the form of a management controller may communicate with other management controllers to form a distributed computing node group. The distributed computing node group may be uniquely identified through one or more attributes including, but not limited to, group name, universally unique identifier (UUID), or group passcode. The group passcode may be shared across the nodes of the distributed computing node group at the time of group configuration. Each node in the distributed computing node group may authenticate with the distributed computing node group using the shared group passcode when the node transitions from an offline state to an online state. Malicious actors may attempt to access the management controller and join the distributed computing node group using brute force attempts or other techniques. The distributed computing node group may include account lockout functionality to disable nodes with repeated login failures. However, account lockout functionality may disable accounts associated with well behaving actors whose account credentials have lapsed. Thus, it may be desirable to support the prevention of account lockouts for well having clients, such as the nodes in a distributed computing node group.

Account lockout functionality in distributed computing node groups may be limited in application due to the need to avoid false positives and authentication disruptions in environment with the potential for concurrent authentication requests. Moreover, few invalid authentication requests may be attempts by malicious actors to gain access to a distributed computing node group. Thus, it may be desirable to support account lockout functionality without locking out well behaving actors that hold expired authentication credentials. A distributed computing node group may support account lockout functionality for preventing well behaving users and well behaving nodes from causing false account lockouts. A master of the group may provide a prior failure timestamp with an initial authentication request. Nodes may maintain a map of prior failure timestamps to masters of groups. The map may be flushed based on the completion of authentication and key exchange with the master of a group or whether an external request generated the authentication attempt. The external request may be an authentication attempt that is triggered due to an external action on the node including, but not limited to, a power cycle or a brute force attempt. Moreover, the master of the group may ignore authentication requests with a prior failure timestamp if the prior failure timestamp is more recent than the timestamp of the last group passcode change. Thus, it may be desirable to handle and/or manage prior failure timestamps in each node in distributed computing node groups.

In one aspect, a disclosed method for account authentication in a distributed computing node group includes sending a message to a member, the message having a first timestamp, increasing an authentication failure count, receiving a first key-exchange message from the member, the first key-exchange message having a second timestamp, evaluating the second timestamp, and determining whether to ignore the first key-exchange message based on an evaluation of the second timestamp. The first timestamp may be associated with a message received from the member prior to sending the message with the first timestamp to the member. The first key-exchange message may include a value computed by the member based on a group passcode shared with the member. The evaluation of the second timestamp may be based on at least one of a default value, the authentication failure count, or a timestamp associated with the group passcode.

In certain embodiments, the method may include determining whether the authentication failure count is greater than an authentication lockout threshold and locking out an account associated with the first key-exchange message based on a determination that the authentication failure count is greater than the authentication lockout threshold. The method may include sending a second key-exchange message to the member, the second key-exchange message including a first secret and a master timestamp, determining whether the member has validated the first secret, and increasing the authentication failure count based on a determination that the member failed to validate the first secret. The method may include sending a second key-exchange message to the member based on a determination not to ignore the first key-exchange message, the second key-exchange message including a first secret based on a group passcode shared with the member and a master timestamp, receiving a third key-exchange message from the second node, third key-exchange message including a second secret in response to the second key-exchange message, validating the second secret and generating an encryption key, sending another message to the member, the other message encrypted with the encryption key and including a group session transport encryption key, and receiving an encrypted message from the member, the encrypted message encrypted with a message key, the message key derived based on the group session transport encryption key.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

Figure 1:
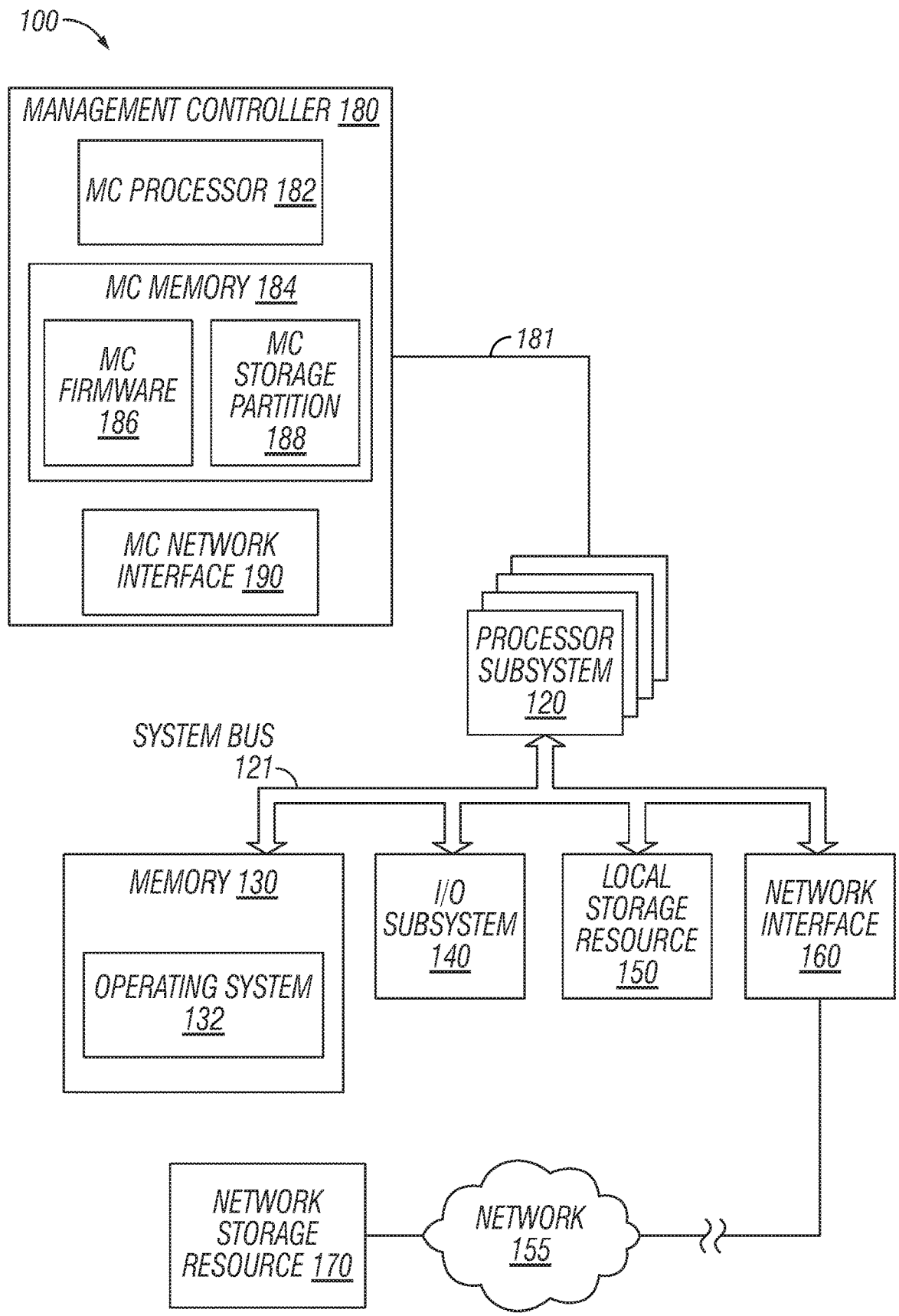
FIG. 1 is a block diagram of selected elements of an information handling system for distributed computing, in accordance with some embodiments of the present disclosure.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
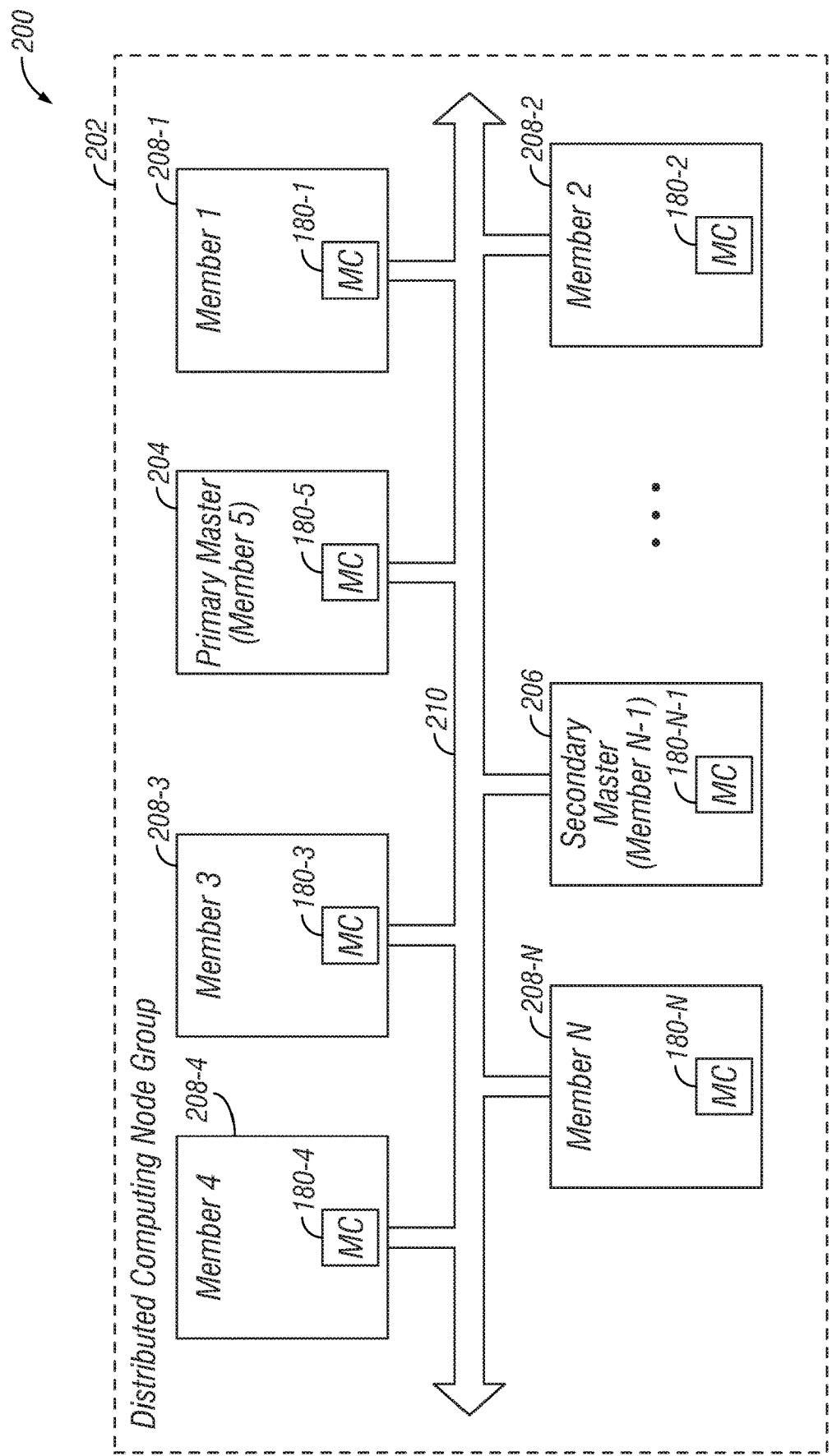
FIG. 2 is a block diagram of selected elements of a distributed computing node group, in accordance with some embodiments of the present disclosure.
Figure 3:
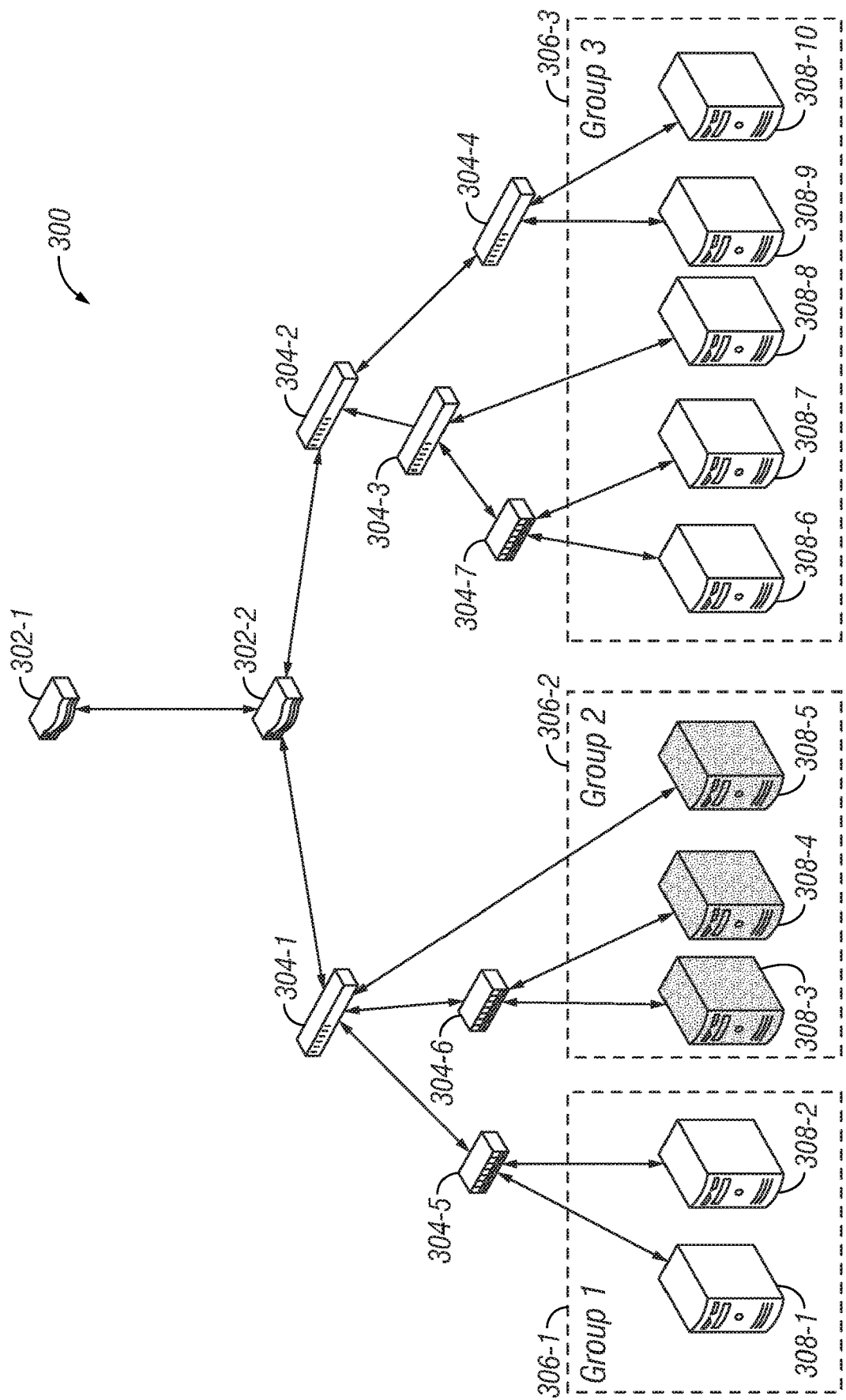
FIG. 3 is a block diagram of selected elements of a distributed computing group hierarchy, in accordance with some embodiments of the present disclosure.

Particular embodiments are best understood by reference to FIGS. 1-3 wherein like numbers are used to indicate like and corresponding parts.

Turning now to the drawings, FIG. 1 illustrates a block diagram depicting selected elements of an embodiment of information handling system 100 for preventing well having clients from causing account lockouts. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware in processor subsystem 120). In the same or alternative embodiments, processor subsystem 120 may interpret and/or execute program instructions and/or process data stored remotely (e.g., in a network storage resource 170).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC 180 may interface with processor subsystem 120 using any suitable communication link 181 including, but not limited to, a direct interface with a platform controller hub, a system bus, and a network interface. The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. The network interface may be network interface 160 and/or network interface 190. The platform controller hub may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express.

MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller, which may assist in a variety of functions including, but not limited to, monitoring, updating, maintaining, testing, and deploying one or more components for an information handling system.

Management controller 180 may communicate with other management controllers using MC network interface 190. A set of management controllers in communication may form a group, in which each management controller may be a node. One of the management controllers in the group may operate as a group manager or a master. The master may facilitate and manage secure communication between the management controllers in the group. A set of groups in communication may form an aggregate group, in which each group may be a local group. Additional levels in the management controller hierarchy may be formed including, but not limited to, a larger aggregate group including a set of aggregate groups.

A distributed computing node group supporting account lockout functionality may use an authentication failure counter stored in a management controller designated as a master and a master timestamp map stored by each member in the group. The use of a master timestamp map may enable account lockout functionality without locking out well behaving actors by sending a master timestamp with an initial authentication request. The current master timestamp in the master timestamp map may be flushed if a member receives an external request or if authentication is successful. The master may ignore authentication requests in which the provided timestamp is not the default value and the prior failure timestamp is more recent than the timestamp of the last group passcode change. The master may increment an authentication failure count if validation of a secret is not successful and may determine whether an account is locked out after receiving an initial key exchange message from a member. An account may be locked out based on whether the authentication failure count exceeds a threshold.

Referring now to FIG. 2, a block diagram of selected elements of a distributed computing node group 202 is shown in accordance with some embodiments of the present disclosure. A set of information handling systems 200 may be grouped together to form a distributed computing node group 202. Group 202 may include a plurality of members 208 connected together with messaging channel 210. Although group 202 is shown with seven members, group 202 may include any number of members suitable to form a distributed computing node group.

Each member 208 may include a management controller 180 to manage group communications. Members 208 and/or management controllers 180 may use messaging channel 210 to send and receive messages to each other. The messages may be unencrypted, encrypted, signed, or unsigned. Messaging channel 210 may include any suitable interface between management controllers, including but not limited to a network interface, such as Ethernet, and an I/O interface, such as PCI-E. Group 202 may use authentication to improve the security of communications between members 208.

Group 202 may also include a master, such as a primary master 204 and/or a secondary master 206. The master may control and/or manage group 202. Control of group 202 may include the addition and/or removal of members from group 202, and/or authenticating members of group 202 when the member transitions to an online state from an offline state. The master may perform any operation sufficient to control or manage distributed computing node group 202. For example, the primary master may be selected at random. As another example, the primary master may be selected using the timestamp of entry into the group, in which the most recent member to join the group or the least recent member to join the group is elected the primary master. The secondary master 206 may serve as the master when the primary master is offline or unavailable. The election or selection of the secondary master 206 may be performed in a similar manner as the primary master.

Each member (204, 206, 208) in distributed computing node group 202 may maintain a node timestamp, which may include shout counters and whisper counters. Shout counters may include an outgoing shout counter for the group and an incoming shout counter for the group. Whisper counters may include an outgoing whisper counter and an incoming whisper counter for each member in the group. For example, if a group contains four members, the node timestamp for each member may include a set of shout counters and three sets of whisper counters. In this example, the set of shout counters may include an outgoing shout counter and an incoming shout counter, and the three sets of whisper counters may include a set for other members of group 202, in which each set corresponds to another member in group 208 and includes an outgoing counter and incoming counter. The shout counters and whisper counters may be reset across group 202 in response to the occurrence of a specific group event, such as the rotation of the group session transport encryption key or the assignment of a new group master.

An outgoing shout counter may be incremented when broadcasting a message to group 202 and the incoming whisper counter may be incremented when receiving a message broadcast to group 202 by another member of the group. When sending a shout to group 202, a member may increment the outgoing shout counter and broadcast the message over messaging channel 210. The message may include the outgoing shout counter that has been incremented and the incoming shout counter. Other members in group 202 may receive the message, perform decryption, and compare the incremented outgoing shout counter to a locally stored incoming shout counter. The receiving member may discard the message if the incremented outgoing shout counter is less than the locally stored incoming shout counter.

An outgoing whisper counter may be incremented when sending a message to a particular member in the group and an incoming whisper counter may be incremented when receiving a message to a particular member in group 202. When sending a message to a particular member of group 202, a member may increment the outgoing whisper counter to the particular member and send a message to the member over messaging channel 210. The message may include the outgoing whisper counter that has been incremented and the incoming whisper counter for the particular member. The member may receive the message, perform decryption, and compare the incremented outgoing whisper counter to a locally stored incoming whisper counter for the member that sent the message. The receiving member may discard the message if the incremented outgoing whisper counter is less than the locally stored incoming whisper counter for the member.

Referring now to FIG. 3, a block diagram of selected elements of a distributed group 300 is shown in accordance with some embodiments of the present disclosure. The distributed group 300 may include a one or more routers 302, which form part of a network. The network may be a public and/or private network. Router 302-2 may route data between different distributed groups and/or within a distributed group. The distributed group 300 may also include one or more switches 304. Downstream of the routers, switches 304-1 and 304-2 may interface exclusively with other switches (304-3, 304-4, 304-5, 304-6 and 304-7). The switches 304 and routers 302 may collectively operate to facilitate the transmission of messages between the nodes in the distributed group.

The nodes may be grouped together to perform a particular type of function. For example, group 306-1 may include two information handling systems 308-1 and 308-2, which may be used for a SharePoint application. Group 306-2 may include three information handling systems 308-3, 308-4, and 308-5, which may be used for file and print operations. Group 306-3 may include five information handling systems 308-6, 308-7, 308-8, 308-9, and 308-10, which may be used for running various other applications. Each group may be uniquely identified through one or more attributes including, but not limited to, group name, universally unique identifier (UUID), or group passcode. Although a particular number of information handling systems are shown, one or more information handling systems may be configured to form one or more portions of a group or one or more groups. For example, groups 306-1, 306-2, and 306-3 may be subsystems within the same information handling system, such as a virtualized environment operating on the information handling system.

Figure 4:
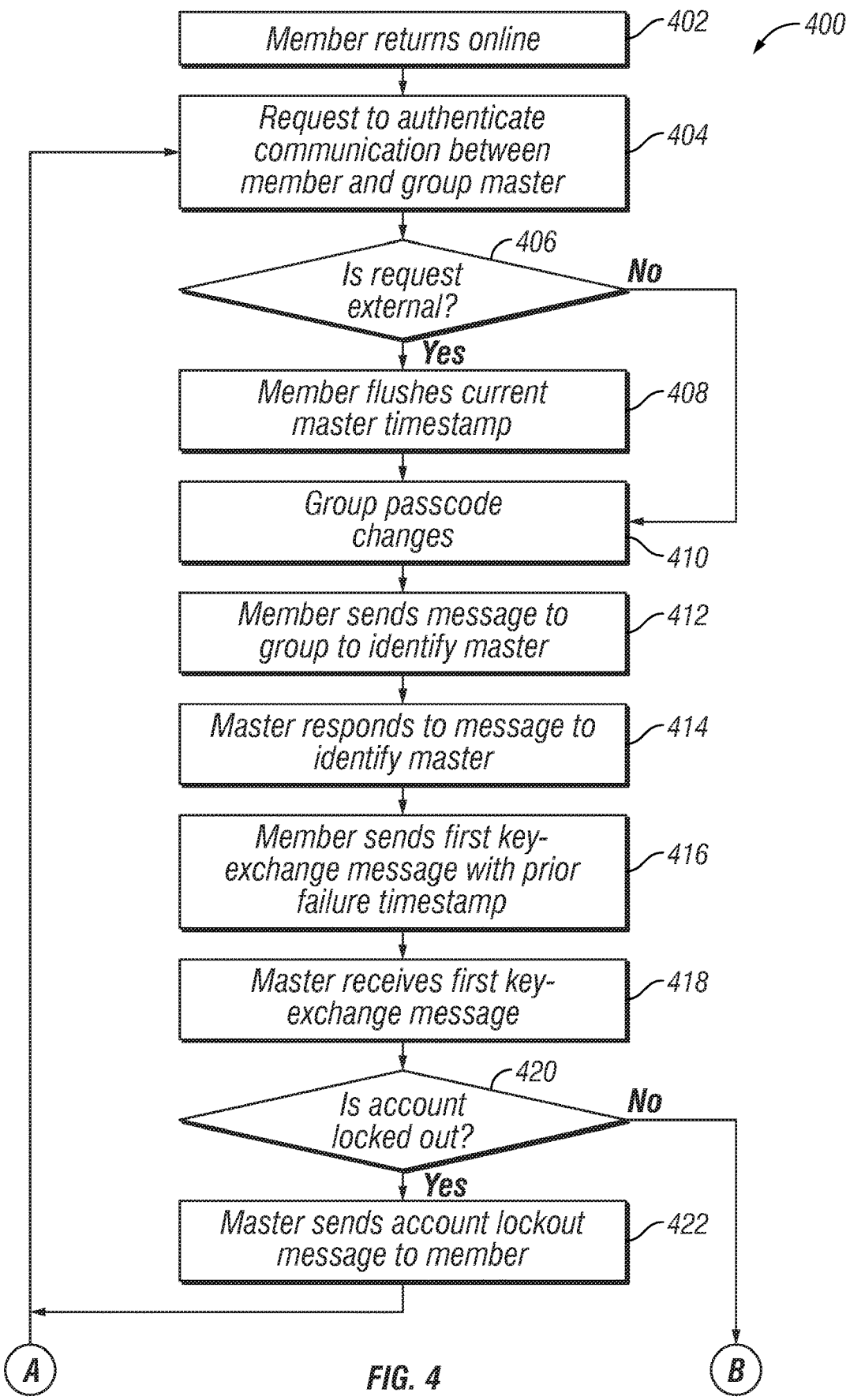
FIG. 4 is a flow chart depicting selected elements of a method for preventing well behaving clients from causing account lockouts, in accordance with some embodiments of the present disclosure.
Figure 4:
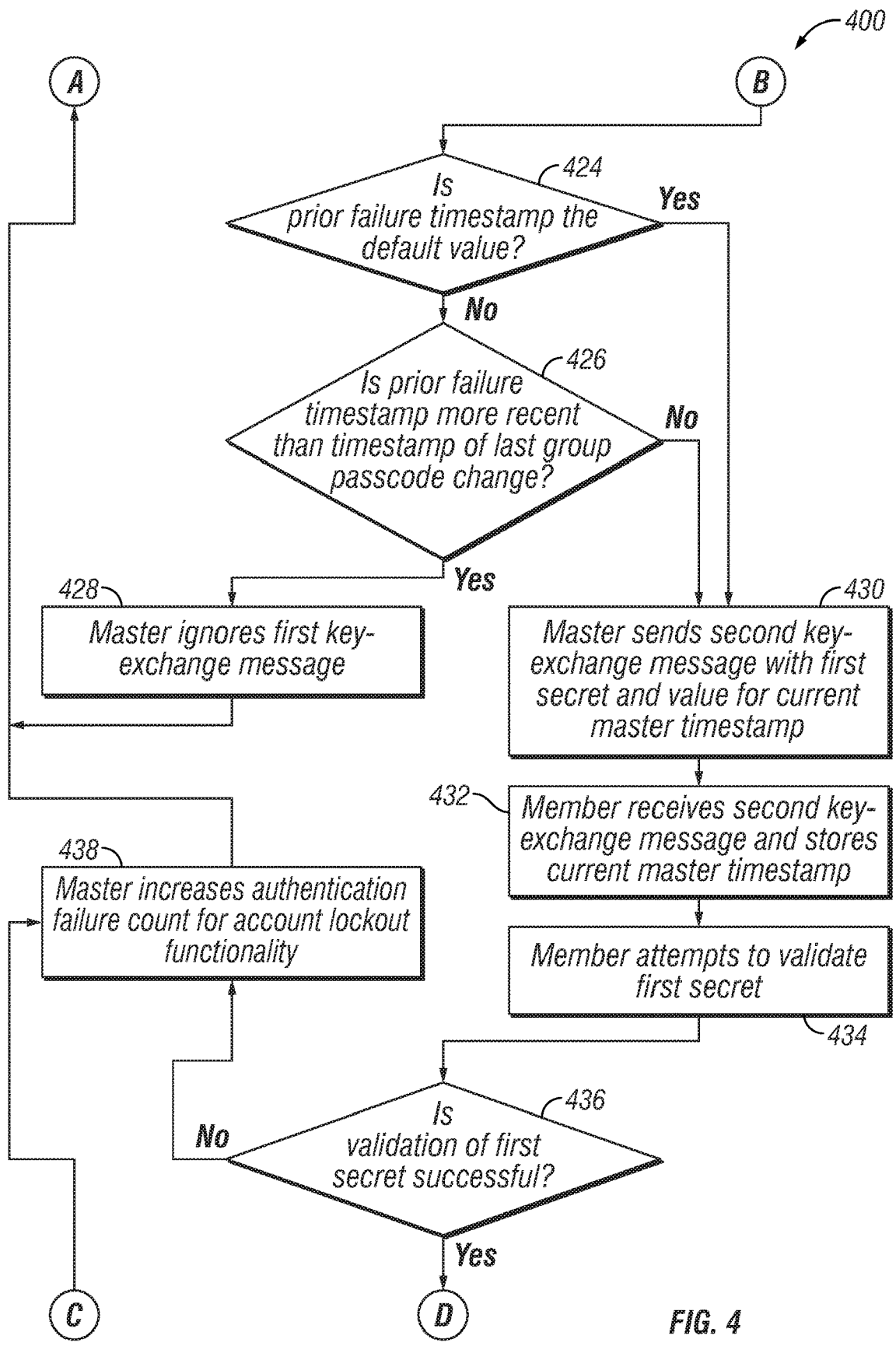
Figure 4:
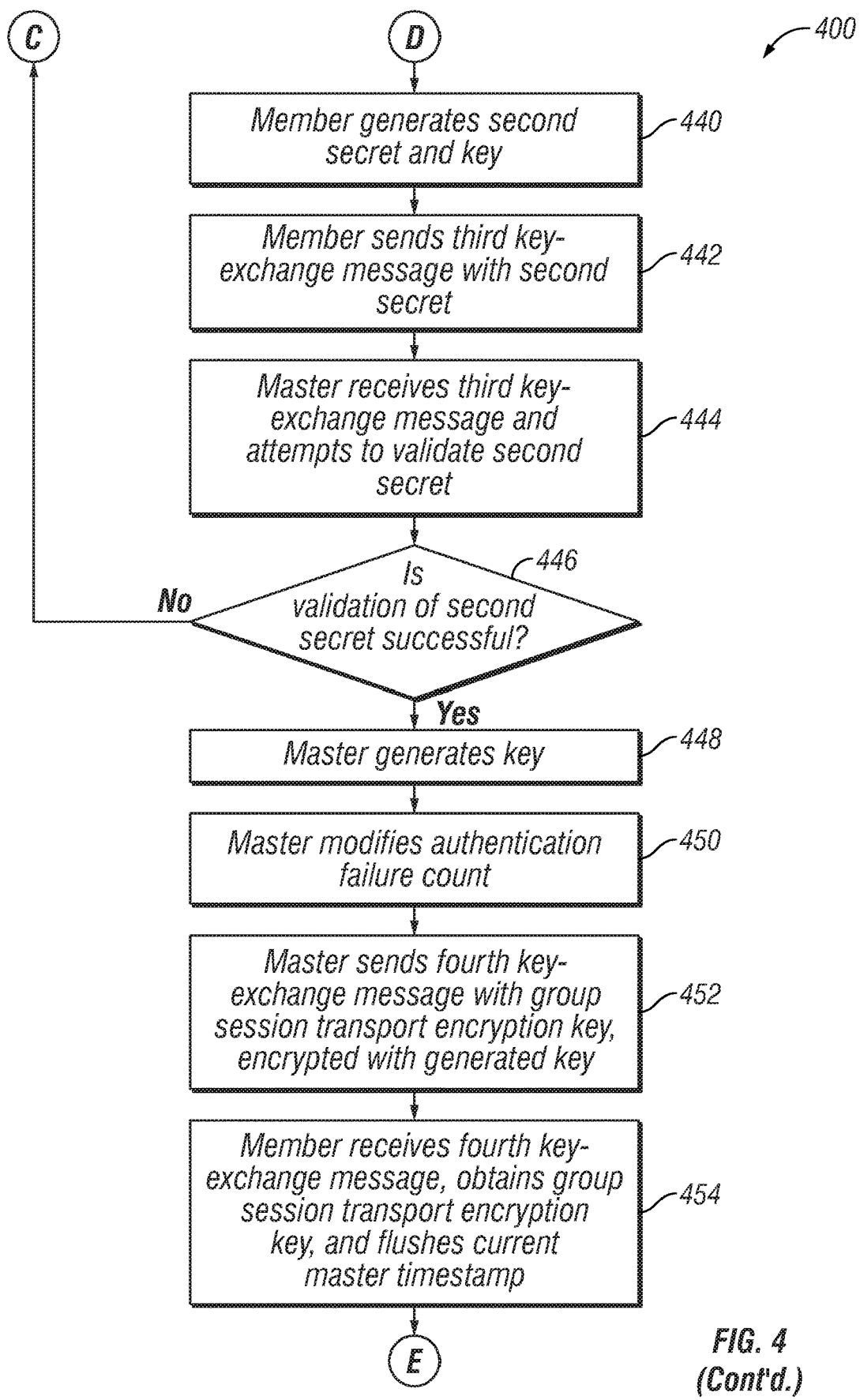
Figure 4:
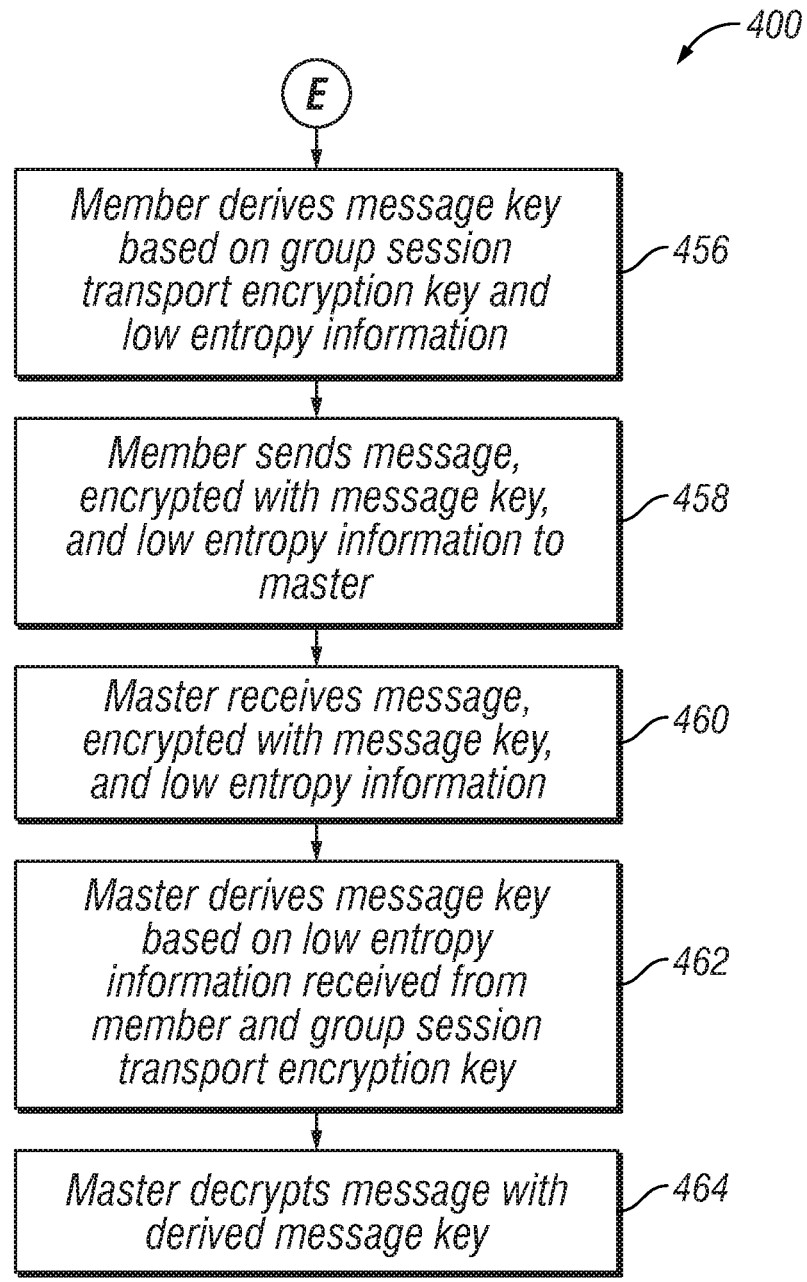

Referring now to FIG. 4, a flow chart depicting selected elements of a method for preventing well behaving clients from causing account lockouts in a group is shown in accordance with some embodiments of the present disclosure. Well behaving clients in a group may include clients, such as members or nodes in the group, that require authentication after transitioning from an offline state to an online state. Method 400 may be implemented by any of the elements shown in FIGS. 1-3. Method 400 may be initiated by any suitable criteria and may initiate operation at any suitable point. In one embodiment, method 400 may initiate operation at 402. Method 400 may include greater or fewer steps than those illustrated. Moreover, method 400 may execute its steps in an order that is different than those illustrated below. Method 400 may terminate at any suitable step. Moreover, method 400 may repeat operation at any suitable step. Portions of method 400 may be performed in parallel and repeat with respect to other portions of method 400.

At 402, a member of a group may return online. The member may have been offline during a group passcode change and may not have received a notification to negotiate for a new group passcode from the group master. The shared group passcode may be used for generating a first secret and a second secret for authentication. At 404, a request to authenticate communication between the member and the group master is made. In one embodiment, the request may be automatically generated based on the member of the group returning online after being offline for a period of time. In another embodiment, the request may also be generated internal to the group by a member of the group. A further embodiment, the request may be generated externally by an actor requesting a member to authenticate communication with the master.

At 406, if the request is external, method 400 may proceed to 408. Otherwise, method 400 may proceed to 410. At 408, the member may flush the current master timestamp. For example, the member may delete an entry in a master timestamp map that correlates master identifiers, such as an I.P. address of the master, with the current master timestamp, which may have been previously provided to the member by the master during a prior authentication request. Although a map is described, any data structure suitable for storing the current master timestamp may be used. The member may use a default value for the timestamp.

At 410, the group passcode may change. The group passcode may change based on a request or the expiration of the current group passcode. A request may be made by a user logged into a member in the group. The current group passcode may expire based on the age of the current group passcode or the number of authentication attempts performed making use of the current group passcode. A member of the group may not receive a notification associated with the group passcode change if the member was offline during a portion of the group passcode change. Accordingly, the member may not have the new group passcode upon returning online, as described by 402.

At 412, a member sends a message to the group to identify the master. The member may send the message as a shout. Shout messages may be sent by incrementing the shout counter associated with outgoing messages and including at least the incremented shout counter in the outgoing message. The member may also include a shout counter associated with incoming messages in the shout message. Members of the group that receive the shout message may discard the message if the incremented shout counter is less than a locally stored shout counter.

At 414, a master of the group may respond to the shout message. The master may send a whisper message back to the member that sent the shout message. The whisper message may identify the master to the member. Whisper messages may be sent by incrementing a whisper counter associated with outgoing messages to a particular member of the group and including at least the incremented whisper counter in the outgoing message. The master may also include a whisper counter associated with incoming messages from the particular member in the whisper message. The member receiving the whisper message may discard the message if the incremented shout counter is less than a locally stored whisper counter.

At 416, the member may send a first key-exchange message to the master. The first key-exchange message may include a prior failure timestamp associated with the master. The prior failure timestamp may be stored in a timestamp map that associates a prior failure timestamp with a particular master. The first key-exchange message may also include a value derived by the member as part of a password authenticated key exchange. For example, if the key exchange involves Diffie-Hellman keys the derived value may be based on random exponent and a secret password.

At 418, the master receives the first key-exchange message from the member. At 420, the master may determine whether the account is locked out. The determination may be based on whether the authentication failure count is greater than a threshold. The threshold may be fixed or variable based on any number of factors including, but limited to, time and the number of successful authentications. For example, the threshold may be defined as three failed authentication attempts within a period of time, such as one minute. The threshold may be reset or the authentication failure count may be reduced after a fixed or variable period of time, such as a number of minutes defined by the number of failed authentication attempts. If the account is locked out, method 400 may proceed to 422. Otherwise, it may proceed to 424.

At 422, the master may send an account lockout message to the member. The account lockout message may inform the member that a particular user account or members of the group are prohibited from requesting authentication from the master. The account lockout message may further include a description of the nature of the account lockout, including details about the manner in which the account was locked out, such as the number of failed authentication attempts or the duration of the lockout. The member may retry its request to authenticate at a later time at 404.

At 424, the master may determine whether the prior failure timestamp is the default value. The member may provide the default value if the timestamp map is flushed, or if no entry for the particular master is found in the timestamp map. If the prior failure timestamp is the default value, method 400 may proceed to 430. Otherwise, it may proceed to 426. At 426, the master may determine whether the prior failure timestamp is more recent than the timestamp of the last group passcode change. If the prior failure timestamp is more recent, method 400 may proceed to 428.

At 428, the master may ignore the first key-exchange message due to a determination that the prior failure timestamp is not the default value and a determination that the prior failure timestamp is more recent than the timestamp of the last group passcode change. The member may have been offline when the group passcode previously changed. An offline member that returns online may rejoin the group automatically. Accordingly, the first authentication attempt by the member may increase the authentication failure count because validation of the first secret may fail as described below. The rejoining member may then automatically retry to authenticate with the group. The master may ignore such attempts because the member has a prior failure timestamp more recent than the timestamp of the last group passcode change. The member may be able to rejoin the group when the group passcode changes again or as a result of the configuration of the most recent group passcode at the member.

At 430, the master may send a second key-exchange message with a first secret and a value for the current master timestamp. The first secret may be derived based at least on the shared group passcode. The current master timestamp may correspond to any suitable time associated with the second key-exchange message. For example, the time that the master receive the first key-exchange message may be used for the current master timestamp. At 432, the member may receive the second key-exchange message from the master. The member may store the current master timestamp found in the second key-exchange message. For example, the member may insert an entry in a prior failure timestamp map. The entry may include an identifier for the master and the current master timestamp that the master sent to the member. The member may use the current master timestamp in subsequent authentication requests.

At 434, the member may attempt to validate the first secret. For example, validating of the first secret may include computing the first secret and comparing the computed secret to the received secret to determine whether there is a match. At 436, the member may determine whether the validation of the first secret was successful. For example, validation may be successful if a computed first secret matches the received first secret. If validation was successful, method 400 may proceed to 440. Otherwise, method 400 may proceed to 438. At 438, the master may increase the authentication failure count, which may be used for account lockout functionality. The authentication failure count may be used for all members and users in the group or may be specific to a particular user account or member. The master may use a timer that starts based on when the first secret was sent to the member. If the member does not respond within a timeout period, the master may determine that the member's validation of the first secret failed and increment the authentication failure count. The master may also increment the authentication failure count if the member responds with a message indicating that validation of the first secret failed. After the authentication failure count is incremented, method 400 may proceed to 404.

At 440, the member may generate a second secret to share with the master and generates the encryption key that may be used for future communication with the master. At 442, the member may send a third key-exchange message to the master. The third key-exchange message may include the second secret generated by the member. At 444, the master may receive the third key-exchange message and attempt to validate the second secret. Validation of the second secret may be performed by generating the second secret locally and comparing the generated key to the received key to determine whether there is a match. At 446, the master may determine whether validation of the second secret was successful. If validation was successful, method 400 may proceed to 448. Otherwise, method 400 may proceed to 438. At 448, the master may generate the encryption key, which matches the encryption key generated by the member. The generation of the encryption key may indicate that the authentication attempt by the member was successful.

At 450, the master may modify the authentication failure count based on the successful authentication attempt. For example, the master may reduce the authentication failure count by a fixed amount, such as a decrement. As another example, the master may reset the authentication failure count. As a further example, the master may reduce the authentication failure count by the number of authentication failures encountered by the particular member whose authentication request was successful or by the number of authentication failures encountered since the particular member sent the authentication request to the master.

At 452, the master may send a fourth key-exchange message with a group session transport encryption key. The fourth key-exchange message may be encrypted with the key generated after the master received the second secret from the member. At 454, the member may receive the fourth key-exchange message from the master. The member may decrypt the message to obtain the group session transport encryption key. The member may flush the current master timestamp from the master timestamp map based on successful authentication with the master. Authentication may be successful if the member validates the first secret and/or if the master sends a message to the member after validating the second secret. For example, the master may validate the second secret and then send a message to the member with the group session transport encryption key. At 456, the member may derive a message key based on the obtained group session transport encryption key and a seed. The message key may be used to encrypt one message to the master. The seed may be based on low entropy information, such as a password or personal identification number.

At 458, the member may send a message encrypted with the message key to the master. The message may include the seed or low entropy information in a portion of the message encrypted with the group session transport encryption key. At 460, the master may receive the message sent by the member that the member encrypted with the message key. At 462, the master may derive the message key based on seed or low entropy information received from the member and the group session transport encryption key. The master may decrypt the portion of the message with the seed or low entropy information using the group session transport encryption key and may then use the seed or low entropy information to generate the message key. At 464, the master may use the generated message key to decrypt the message.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for preventing account lockouts in a distributed computing node group, comprising:
    sending a message to a group to identify a master of the group;
    receiving a response to the message, the response received from the master to identify the master of the group;
    sending a first key-exchange message to the master, the first key-exchange message comprising:
        a first timestamp;
        a value computed based on a shared group passcode;
    receiving a second key-exchange message from the master in response to the first key-exchange message, the second key-exchange message comprising:
        a first secret based on the shared group passcode;
        a second timestamp;
    sending a third key-exchange message to the master, the third key-exchange message comprising:
        a second secret generated after a validation of the first secret;
    receiving a fourth key-exchange message from the master in response to the third key-exchange message, the fourth key-exchange message encrypted with an encryption key corresponding to the second secret;
    decrypting the fourth key-exchange message using the encryption key to obtain a group session transport encryption key;
    deriving a message key based on the group session transport encryption key and a seed; and
    sending an encrypted message to the master, the encrypted message encrypted with the message key.

2. The method of claim 1, further comprising:
    determining whether a request to authenticate communication with the master of the group is an external request; and
    flushing a timestamp stored in a timestamp map in response to a determination that the request to authenticate communication with the master of the group is an external request, the timestamp associated with the master of the group.

3. The method of claim 1, further comprising:
    receiving an account lockout message from the master in response to the first key-exchange message;
    updating the first timestamp of the first key-exchange message in response to the account lockout message; and
    re-sending the first key-exchange message to the master, the first key-exchange message having the first timestamp updated.

4. The method of claim 1, wherein:
    the message to identify the master of the group is a shout message;
    the shout message comprising a shout counter, wherein the shout counter is incremented before the message to identify the master is sent;
    the response to the message to identify the master of the group is a whisper message;
    the whisper message comprising a whisper counter associated with messages from the member that sent the whisper message; and
    the whisper message is retained based on a determination that the shout counter that is incremented is greater than or equal to the whisper counter.

5. The method of claim 1, further comprising:
    storing the second timestamp by inserting an entry in a timestamp map, wherein the entry comprises:
    an identifier for the master; and
    the second timestamp.

6. The method of claim 5, further comprising:
    flushing the second timestamp from the timestamp map based on a determination that communication with the master is authenticated.

7. An information handling system, comprising:
    a processor subsystem having access to a first memory;
    a management controller comprising a secondary processor having access to a second memory, the second memory configured with an embedded storage partition and the second memory storing instructions executable by the secondary processor to:
        send a message to a group to identify a master of the group;
        receive a response to the message, the response received from the master to identify the master of the group;
        send a first key-exchange message to the master, the first key-exchange message comprising:
            a first timestamp;
            a value computed based on a shared group passcode;
        receive a second key-exchange message from the master in response to the first key-exchange message, the second key-exchange message comprising:
            a second timestamp;
            a first secret based on the shared group passcode;
        send a third key-exchange message to the master, the third key-exchange message comprising:
            a second secret generated after a validation of the first secret;
        receive a fourth key-exchange message from the master in response to the third key-exchange message, the fourth key-exchange message encrypted with an encryption key corresponding to the second secret;
        decrypt the fourth key-exchange message using the encryption key to obtain a group session transport encryption key;
        derive a message key based on the group session transport encryption key and a seed; and
        send an encrypted message to the master, the encrypted message encrypted with the message key.

8. The information handling system of claim 7, wherein the second memory further stores instructions executable by the secondary processor to:
  determine whether a request to authenticate communication with the master of the group is an external request; and
  flush a timestamp stored in a timestamp map in response to a determination that the request to authenticate communication with the master of the group is an external request, the timestamp associated with the master of the group.

9. The information handling system of claim 7, wherein the second memory further stores instructions executable by the secondary processor to:
  receive an account lockout message from the master in response to sending the first key-exchange message;
  update the first timestamp of the first key-exchange message in response to the account lockout message; and
  re-send the first key-exchange message to the master, the first key-exchange message having the first timestamp updated.

10. The information handling system of claim 7, wherein:
  the message to identify the master of the group is a shout message;
  the shout message comprising a shout counter, wherein the shout counter is incremented before the message to identify the master is sent;
  the response to the message to identify the master of the group is a whisper message;
  the whisper message comprising a whisper counter associated with messages from the member that sent the whisper message; and
  the whisper message is retained based on a determination that the incremented shout counter is greater than or equal to the whisper counter.

11. The information handling system of claim 7, wherein the second memory further stores instructions executable by the secondary processor to:
  store the second timestamp by insertion of an entry in a timestamp map, wherein the entry comprises:
    an identifier for the master; and
    the second timestamp.

12. The information handling system of claim 11, wherein the second memory further stores instructions executable by the secondary processor to:
  flush the second timestamp from the timestamp map based on a determination that communication with the master is authenticated.

13. The information handling system of claim 12, wherein the determination that communication with the master is authenticated comprises at least one of:
  the validation the first secret of the second key-exchange message received from the master; or
  the receipt and decryption of the fourth key-exchange to obtain the group session transport encryption key.

14. A management controller for an information handling system having a primary processor and a primary memory, the management controller comprising a secondary processor having access to a secondary memory, the secondary memory configured with an embedded storage partition and the secondary memory storing instructions executable by the secondary processor to:
  send a message to a group to identify a master of the group;
  receive a response to the message, the response received from the master to identify the master of the group;
  send a first key-exchange message to the master, the first key-exchange message comprising:
    a first timestamp;
    a value computed based on a shared group passcode;
  receive a second key-exchange message from the master in response to the first key-exchange message, the second key-exchange message comprising:
    a second timestamp;
    a first secret based on the shared group passcode;
  send a third key-exchange message to the master, the third key-exchange message comprising:
    a second secret generated after a validation of the first secret;
  receive a fourth key-exchange message from the master in response to the third key-exchange message, the fourth key-exchange message encrypted with an encryption key corresponding to the second secret;
  decrypt the fourth key-exchange message using the encryption key to obtain a group session transport encryption key;
  derive a message key based on the group session transport encryption key and a seed; and
  send an encrypted message to the master, the encrypted message encrypted with the message key.

15. The management controller of claim 14, wherein the second memory further stores instructions executable by the secondary processor to:
  determine whether a request to authenticate communication with the master of the group is an external request; and
  flush a timestamp stored in a timestamp map in response to a determination that the request to authenticate communication with the master of the group is an external request, the timestamp associated with the master of the group.

16. The management controller of claim 14, wherein the second memory further stores instructions executable by the secondary processor to:
  receive an account lockout message from the master in response to sending the first key-exchange message;
  update the first timestamp of the first key-exchange message in response to the account lockout message; and
  re-send the first key-exchange message to the master, the first key-exchange message having the first timestamp updated.

17. The management controller of claim 14, wherein:
  the message to identify the master of the group is a shout message;
  the shout message comprising a shout counter, wherein the shout counter is incremented before the message to identify the master is sent;
  the response to the message to identify the master of the group is a whisper message;
  the whisper message comprising a whisper counter associated with messages from the member that sent the whisper message; and
  the whisper message is retained based on a determination that the incremented shout counter is greater than or equal to the whisper counter.

18. The management controller of claim 14, wherein the second memory further stores instructions executable by the secondary processor to:
  store the second timestamp by insertion of an entry in a timestamp map, wherein the entry comprises:
    an identifier for the master; and
    the second timestamp.

19. The management controller of claim 18, wherein the second memory further stores instructions executable by the secondary processor to:
  flush the second timestamp from the timestamp map based on a determination that communication with the master is authenticated.

20. The management controller of claim 19, wherein the determination that communication with the master is authenticated comprises at least one of:
  the validation the first secret of the second key-exchange message received from the master; or
  the receipt and decryption of the fourth key-exchange to obtain the group session transport encryption key.

* * * * *